(12) United States Patent
Korte et al.

(10) Patent No.: US 11,993,179 B2
(45) Date of Patent: May 28, 2024

(54) BRAKE ASSIST FOR AN INOPERABLE ELECTRONIC BOOSTER BRAKE SYSTEM

(71) Applicant: Ford Global Technologies, LLC, Dearborn, MI (US)

(72) Inventors: Chad Korte, Grosse Ile, MI (US); Daniel A. Gabor, Canton, MI (US); Thomas Svensson, Leichingen (DE); Harold Felch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 17/557,789

(22) Filed: Dec. 21, 2021

(65) Prior Publication Data

US 2023/0191914 A1 Jun. 22, 2023

(51) Int. Cl.
*B60T 8/88* (2006.01)
*B60L 7/26* (2006.01)
(Continued)

(52) U.S. Cl.
CPC ............. *B60L 7/26* (2013.01); *B60L 15/2009* (2013.01); *B60T 7/042* (2013.01); *B60T 8/885* (2013.01);
(Continued)

(58) Field of Classification Search
CPC .. B60L 7/26; B60L 15/2009; B60L 2240/423; B60L 2240/443; B60L 2250/26;
(Continued)

(56) References Cited

U.S. PATENT DOCUMENTS 6,254,202 B1 * 7/2001 Kawamoto ............... B60T 7/22
303/191
9,248,810 B2 2/2016 Olofsson
(Continued)

FOREIGN PATENT DOCUMENTS

CN 112706737 A 4/2021

*Primary Examiner* — Erick R Solis
(74) *Attorney, Agent, or Firm* — Burr & Forman LLP; Lorne Forsythe

(57) ABSTRACT

A vehicle control system may include a brake pedal position sensor, a braking torque module, an accelerator pedal position sensor, and a brake augmenter. The brake pedal position sensor is operably coupled to a brake pedal to determine a brake pedal position responsive to actuation of the brake pedal by an operator. The braking torque module is operably coupled to wheels of the vehicle to provide negative torque to the wheels based on the brake pedal position when an EBB system is in an operable state. The accelerator pedal position sensor is operably coupled to an accelerator pedal to determine accelerator pedal position for generation of positive torque to the wheels based on the accelerator pedal position when the EBB system is in the operable state. The brake augmenter is operably coupled to the accelerator pedal position sensor to provide a negative torque input to the wheels responsive to the accelerator pedal position sensor indicating a first range of pedal positions and a positive torque input to the wheels responsive to the accelerator pedal position sensor indicating a second range of pedal positions when the EBB system is in an inoperable state.

20 Claims, 3 Drawing Sheets

(51) Int. Cl.
  *B60L 15/20* (2006.01)
  *B60T 7/04* (2006.01)
  *B60T 8/92* (2006.01)
  *B60T 8/94* (2006.01)
  *B60T 8/96* (2006.01)

(52) U.S. Cl.
  CPC .................................... *B60T 8/92* (2013.01);
    *B60T 8/94* (2013.01); *B60T 8/96* (2013.01);
    *B60L 2240/423* (2013.01); *B60L 2250/26*
    (2013.01)

(58) Field of Classification Search
  CPC ... B60T 7/04; B60T 7/042; B60T 8/88; B60T
    8/885; B60T 8/92; B60T 8/94; B60T 8/96
  USPC .................................. 701/70, 76, 84, 92, 97
  See application file for complete search history.

(56) References Cited

U.S. PATENT DOCUMENTS

| | | | |
|---|---|---|---|
| 10,328,920 B2 | 6/2019 | Kistner et al. | |
| 2007/0267915 A1* | 11/2007 | Shimada | B60W 10/08 |
| | | | 303/122 |
| 2020/0180432 A1 | 6/2020 | Gauthier | |
| 2021/0269005 A1 | 9/2021 | Wagner et al. | |
| 2022/0017092 A1* | 1/2022 | Kim | B60W 10/192 |
| 2022/0379891 A1* | 12/2022 | Goto | B60L 3/0076 |

* cited by examiner

BRAKE ASSIST FOR AN INOPERABLE ELECTRONIC BOOSTER BRAKE SYSTEM

TECHNICAL FIELD

Example embodiments generally relate to vehicle control algorithms and, more particularly, relate to a system and method for providing a braking assistance feature.

BACKGROUND

Brake boost systems are commonly used in automotive settings in order to increase the actuation force from a driver's foot on a brake pedal to acceptable levels in order to properly engage a vehicle's brakes. Newer vehicles are now often equipped with various automated driver assistance features, and with that comes the need for equipment such as electric brake boost (EBB) systems to take the place of the conventional vacuum style brake boost system. EBB systems therefore determine a driver's braking demand and adjust the braking force accordingly.

Thus, it may be desirable to develop a driver assistance feature that can be used to provide proper braking forces in the event that the EBB system is inoperable.

BRIEF SUMMARY OF SOME EXAMPLES

In accordance with an example embodiment, a vehicle control system for a vehicle may be provided. The system may include a brake pedal position sensor, a braking torque module, an accelerator pedal position sensor, and a brake augmenter. The brake pedal position sensor is operably coupled to a brake pedal to determine a brake pedal position responsive to actuation of the brake pedal by an operator of the vehicle. The braking torque module is operably coupled to one or more wheels of the vehicle to provide negative torque to the one or more wheels based on the brake pedal position when an EBB system of the braking torque module is in an operable state. The accelerator pedal position sensor is operably coupled to an accelerator pedal to determine accelerator pedal position for generation of positive torque to provide to the one or more wheels based on the accelerator pedal position when the EBB system is in the operable state. The brake augmenter is operably coupled to the accelerator pedal position sensor to provide a negative torque input to the one or more wheels responsive to the accelerator pedal position sensor indicating a first range of pedal positions and a positive torque input to the one or more wheels responsive to the accelerator pedal position sensor indicating a second range of pedal positions when the EBB system is in an inoperable state.

In another example embodiment, a torque control module of a vehicle may be provided. The torque control module may include a braking torque module, a positive torque module and a brake augmenter. The braking torque module may be operably coupled to one or more wheels of the vehicle to provide negative torque to the one or more wheels based on brake pedal position when an EBB system of the braking torque module is in an operable state. The positive torque module may be operably coupled to the one or more wheels to provide positive torque to the one or more wheels based on accelerator pedal position when the EBB system is in the operable state. The brake augmenter may be operably coupled to an accelerator pedal position sensor to provide a negative torque input to the one or more wheels responsive to the accelerator pedal position sensor indicating a first range of pedal positions and a positive torque input to the one or more wheels responsive to the accelerator pedal position sensor indicating a second range of pedal positions when the EBB system is in an inoperable state.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
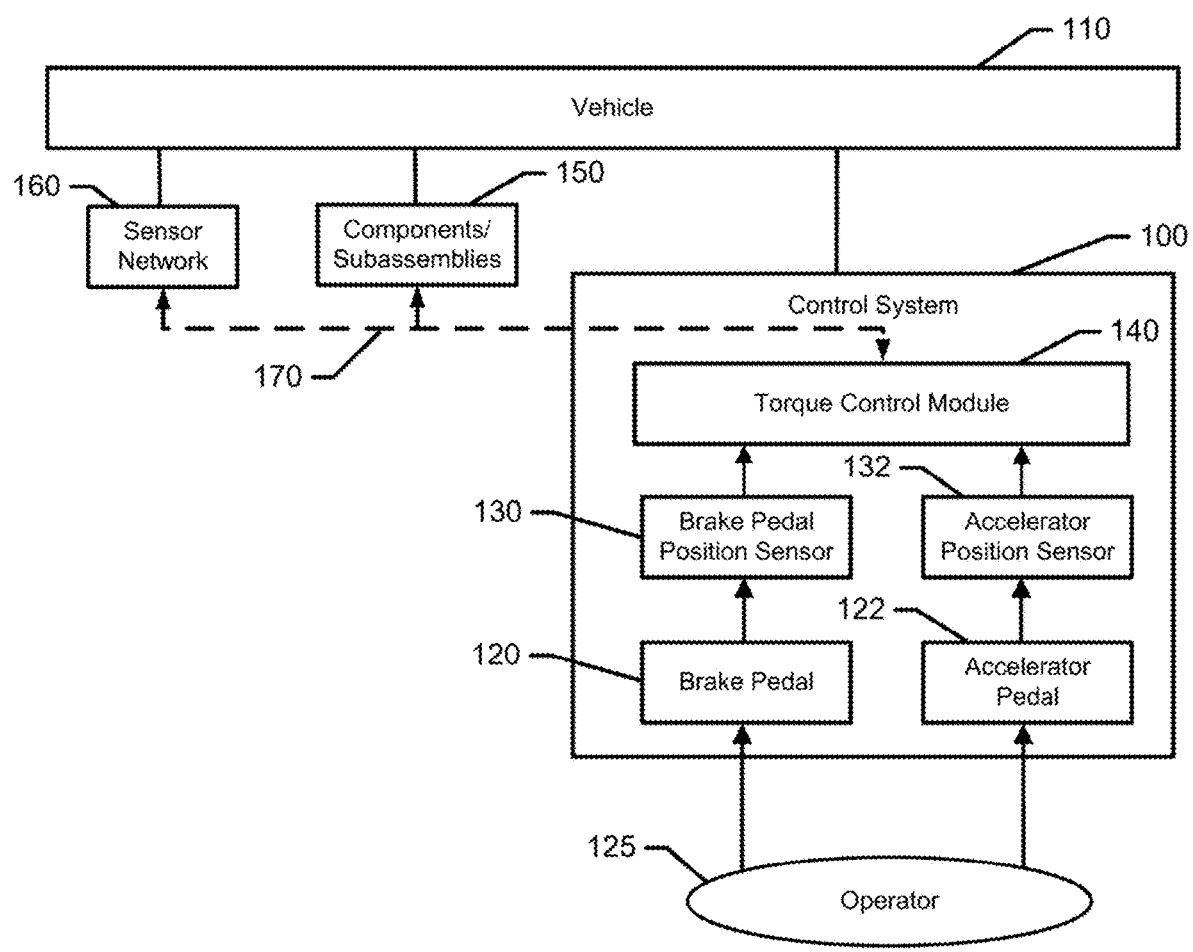
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In some embodiments, the control pedals may include a brake pedal 120 and an accelerator pedal 122. However, the control pedals could alternatively be hand operated or any other operable member via which an operator 125 may provide an input indicative of an intent of the operator relative to controlling net torque for application to the wheels of the vehicle 110.

The control system 100 may also include position sensors for each of the brake pedal 120 (which may have a corresponding brake pedal position sensor 130) and the accelerator pedal 122 (which may have a corresponding accelerator position sensor 132). The brake pedal position sensor 130 and the accelerator pedal position sensor 132 may provide data indicative of the precise position of the brake pedal 120 and the accelerator pedal 122, respectively, as the input to a torque control module 140. The torque control module 140 may be configured to determine individual inputs of negative and positive torque (e.g., net torque) as described herein based on inputs from the brake pedal position sensor 130, the accelerator pedal position sensor 132, or other components of the vehicle 110. In some cases, the control system 100 may be configured to perform other tasks related or not related to propulsive and braking control or performance management.

In an example embodiment, the control system 100 may receive information that is used to determine vehicle status from various components or subassemblies 150 of the vehicle 110. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170.

The components or subassemblies 150 may include, for example, a braking system, a propulsion system and/or a wheel assembly of the vehicle 110. The braking system may be configured to provide braking inputs to braking components of the vehicle 110 (e.g., electro-mechanical brakes, hydraulic brakes, regenerative brakes, etc.) based on a braking torque determined by the torque control module 140. The braking system may also include more than one type of braking hardware. For example, the braking system of the vehicle 110 may include a combination of hydraulic brakes and electro-mechanical brakes. In an example embodiment, the braking system may be a brake-by-wire system and may include an EBB module to facilitate operation of the braking system The propulsion system may include a gas engine, electric motor, or any other suitable propulsion device. In some cases, the propulsion system may also incorporate drive-by-wire components and a corresponding control paradigm.

The torque control module 140 may be configured to determine either or both of propulsive and braking torque inputs for provision to the propulsion and braking systems to apply the respective form of positive or negative torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, vehicle acceleration, front/rear wheel speeds, vehicle pitch, etc.

Accordingly, for example, the control system 100 may be able to receive numerous different parameters, indications and other information that may be related to or indicative of different situations or conditions associated with vehicle status. The control system 100 may also receive information indicative of the intent of the operator 125 relative to control of various aspects of operation of the vehicle 110 and then be configured to use the information received to provide instructions to the torque control module 140 in order to control application of net torque to the wheels of the wheel assembly of the vehicle 110. The control system 100 of FIG. 1 may be similar to conventional systems in many respects, except that, the control system 100 (and in some cases specifically the torque control module 140) may be modified to respond to situations in which the EBB module is inoperable as described in greater detail in reference to FIGS. 2 and 3.

Figure 2:
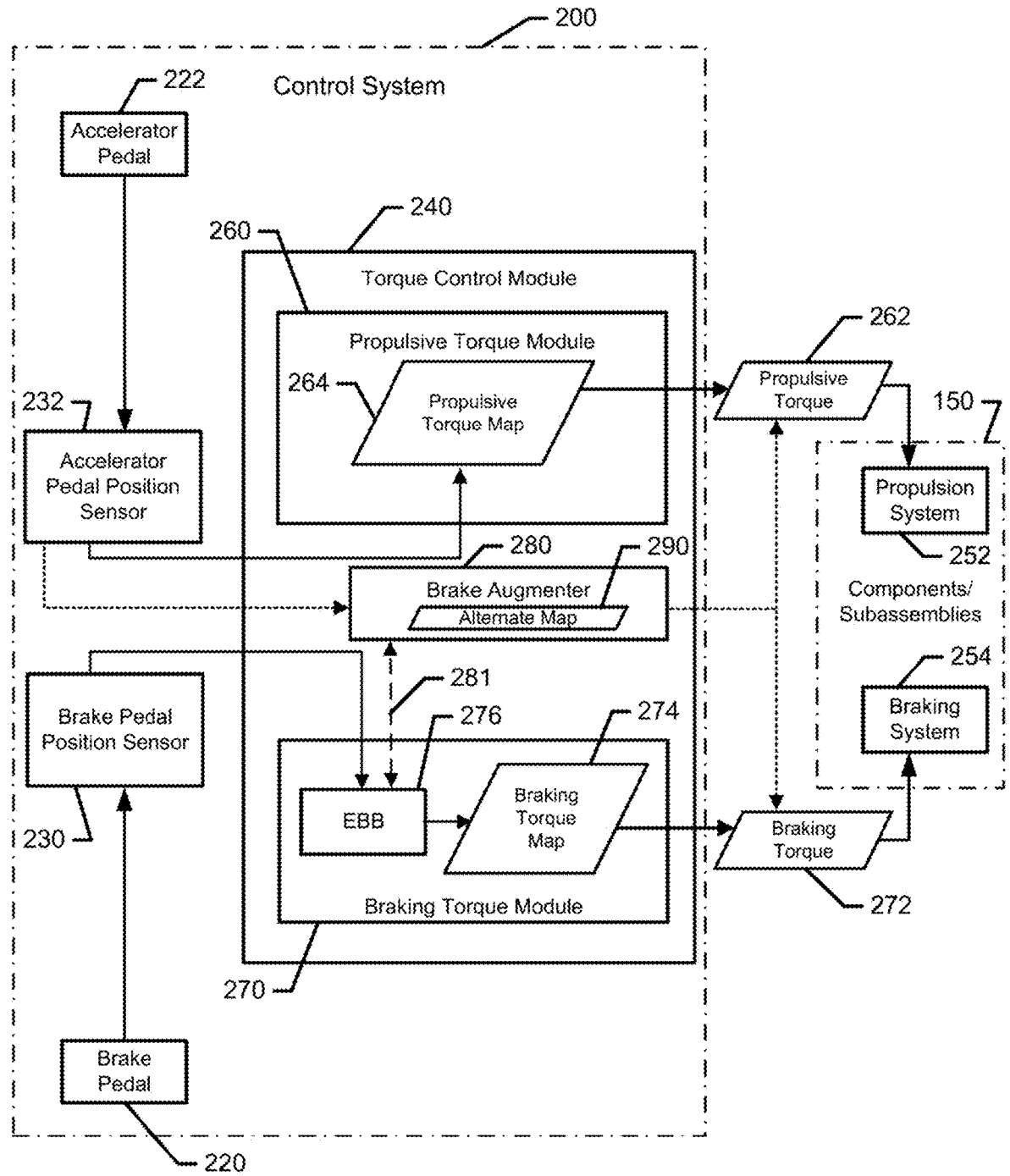
FIG. 2 illustrates a block diagram of some components of the vehicle control system of FIG. 1 in accordance with an example embodiment.

FIG. 2 illustrates a block diagram of various components of a control system 200 (which is a specific example of control system 100 of FIG. 1) in greater detail. In this regard, for example, FIG. 2 illustrates example interactions under normal operating circumstances for the control system 200 between a brake pedal 220 (e.g., an example of brake pedal 120 of FIG. 1), an accelerator pedal 222 (e.g., an example of accelerator pedal 122 of FIG. 1), the torque control module 240 (e.g., an example of the torque control module 140 of FIG. 1) and the components or subassemblies 150 relative to information received thereby (e.g., from the sensor network 160, from various ones of the components/subassemblies 150, and/or from the operator 125).

The control system 200 may include the brake pedal 220, which may have a corresponding brake pedal position sensor 230, and the accelerator pedal 222, which may have an associated accelerator pedal position sensor 232). The torque control module 240 may also be a portion of the control system 200. In some embodiments, the control system 200 may receive an input from an operator 125 in the form of a force applied to either the brake pedal 220 or the accelerator pedal 222. The control system 200 may then communicate the amount of travel of the corresponding pedal that is caused by the force applied by the operator 125 to the torque control module 240 in the form of an electronic signal via the brake pedal position sensor 230 or the accelerator pedal position sensor 232. In some embodiments, the brake pedal position sensor 230 and the accelerator pedal position sensor 232 may include a Hall effect sensor or similar type sensor. The pedal position may then be provided to the torque control module 240 for use as described in greater detail below. In some embodiments, pedal position may be an example of information indicative of operational intent of the operator 125.

The torque control module 240 may include a propulsive torque module 260 and a braking torque module 270. In general, the propulsive torque module 260 may be configured to receive information indicative of operational intent of the operator 125 (e.g., data from the accelerator pedal position sensor 232) and, in some cases, also information indicative of vehicle status (e.g., vehicle speed and/or other parameters), in order to determine a signal, instruction or a value for propulsive torque 262 to be applied to a propulsion system 252 of the vehicle 110 (e.g., a gasoline engine, electric motor, and/or the like). In other words, propulsive torque 262 may be considered to be representative of a propulsive torque request, or a request for a corresponding determined amount of propulsive torque 262. In some example embodiments, the propulsive torque module 260 may determine the propulsive torque 262 using a propulsive torque map 264. The propulsive torque map 264 may be constructed to balance the information indicative of vehicle status with the information indicative of operational intent of the operator 125 in order to infer the desired propulsive torque of the operator 125. In an example embodiment, the propulsive torque map 264 may be generated or otherwise provided by the manufacturer. The propulsive torque map 264 may be generated based on test data gathered over many hours of testing in numerous different conditions and situations. In some cases, the propulsive torque map 264 may provide a mapping of accelerator pedal positions (e.g., as detected by the accelerator pedal position sensor 232) to corresponding propulsive torque 262 values to provide to the propulsion system 252, which may be canceled (at least in part) in some cases (or modes) by any inputs also provided from the braking torque module 270. Thus, for example, the full range of pedal positions may be mapped to corresponding values of the propulsive torque 262. In an example embodiment, the lower end of the range may be expected to be mapped to corresponding low (but generally positive) values of propulsive torque 262, and the values of propulsive torque 262 increase as the higher end of the range of pedal positions is approached.

The braking torque module 270 may be configured to receive information indicative of operational intent of the operator 125 (e.g., data from the brake pedal position sensor 230) and, in some cases, also information indicative of vehicle status (e.g., vehicle speed and/or other parameters), in order to determine a braking torque 272 to be applied to a braking system 254 of the vehicle 110. In other words, braking torque 272 may be considered to be representative of a braking torque request, or a request for a corresponding determined amount of braking torque 272. The braking torque module 270 may determine the braking torque 272 using a braking torque map 274. The braking torque map 274 may be constructed to balance the information indicative of vehicle status with the information indicative of operational intent of the operator 125 in order to infer the desired braking torque 272 of the operator 125. In an example embodiment, the braking torque map 274 may be generated or otherwise provided by the manufacturer. The braking torque map 274 may be generated based on test data gathered over many hours of testing in numerous different conditions and situations. In some cases, the braking torque map 274 may provide a mapping of brake pedal positions (e.g., as detected by the brake pedal position sensor 230) to corresponding braking torque 272 values to provide to the braking system 254. Thus, for example, the full range of pedal positions may be mapped to corresponding values of the propulsive torque 262. However, it should be appreciated that some braking torque 272 may also be generated responsive to inputs from the propulsive torque module 260 (e.g., regenerative braking inputs). In an example embodiment, the lower end of the range may be expected to be mapped to corresponding low (but generally positive) values of propulsive torque 262, and the values of propulsive torque 262 increase as the higher end of the range of pedal positions is approached.

The braking torque module 270 may also include an electronic brake boost (EBB) system 276. The EBB system 276 may supplement the force that the operator 125 applies to the brake pedal 220 to an appropriate level that may be more indicative of the desired braking torque 272 of the operator 125. In other words, the EBB system 276 may determine the operator's 125 braking demands and relay that information to the braking torque map 274 for appropriate translation into braking torque 272. In this regard, the EBB system 276 may be a useful component of the braking torque module 270 with respect to obtaining the braking torque 272 for provision to the braking system 272. In some cases, instead of the ordering shown in FIG. 2, the EBB system 276 may actually receive the braking torque 272, and may amplify or increase the braking torque 272 to electronically provide a "boost" that, in convention braking systems would have been provided by a vacuum boost arrangement. Regardless of component ordering, in the event that the EBB system 276 experiences a malfunction or is inoperable, the braking system 254 may not operate as otherwise planned. In this regard, either the braking torque 272 may be less than an otherwise expected value (e.g., not "boosted") or perhaps interrupted entirely. Thus, it may be desirable to provide a mechanism by which to respond to inoperability of the EBB system 276 with an alternate means by which to manage or generate a value for the braking torque 272.

In some embodiments, a brake augmenter 280 may be included in the torque control module 240 or may otherwise be operably coupled to the torque control module 240 to provide such alternate means. Under normal operating circumstances of the control system 200, such as those described above in reference to FIG. 2, the brake augmenter 280 may not be actively involved in the propulsion or braking of the vehicle 110. Instead, the brake augmenter 280 may monitor for an indication of inoperability of the EBB system 276 in order to be prepared to alter the operations otherwise shown in FIG. 2. As discussed in greater detail below, the indication of inoperability of the EBB system 276 may be provided in any of multiple ways, which may include positive indications of inoperability (e.g., a signal indicating detection of a fault in relation to operability of the EBB system 276) or negative indications of inoperability (e.g., absence or loss of a signal otherwise indicative of the operability of the EBB system 276). FIG. 2 depicts the inactivity of the brake augmenter 280 associated with proper operability of the EBB system 276 by through the use of dotted connectors between the accelerator pedal position sensor 232, the brake augmenter 280, the alternate map 290, propulsive torque 262 and braking torque 272. The monitoring of the operability of the EBB system 276 is represented by operability indicator 281. Operability indicator 281 is a two way dashed arrow indicating that a positive or negative indication of operability may transmit either way between the EBB system 276 and the brake augmenter 280. However, it should be appreciated that such monitoring may also be indirect (e.g., via detecting operability of the braking system 254), and so the two way dashed arrow of the operability indicator 281 could alternatively extend between the brake augmenter 280 and any other component that may be monitored to indicate inoperability (or operability) of the brake augmenter 280. Accordingly, under normal operating circumstances of the control system 200 (e.g., when the EBB system 276 is operable or operating properly), the brake pedal 220 and the accelerator pedal 222 may each provide input signals to the braking torque module 270 and the propulsive torque module 260, respectively, via the brake pedal position sensor 230 and the accelerator pedal position sensor 232, respectively, without the use of the brake augmenter 280. However, the brake augmenter 280 may be activated automatically by the control system 200 in response to a departure from the normal operating circumstances. In this regard, in some embodiments, the brake augmenter 280 may be activated responsive to the control system 200 receiving a positive indication of inoperability from the EBB system 276. In other cases, the brake augmenter 280 may be activated responsive to an absence of an indication of operability of the EBB system 276. In either case, however, the result is the alteration of the operation of the control system 200 shown in FIG. 2.

Figure 3:
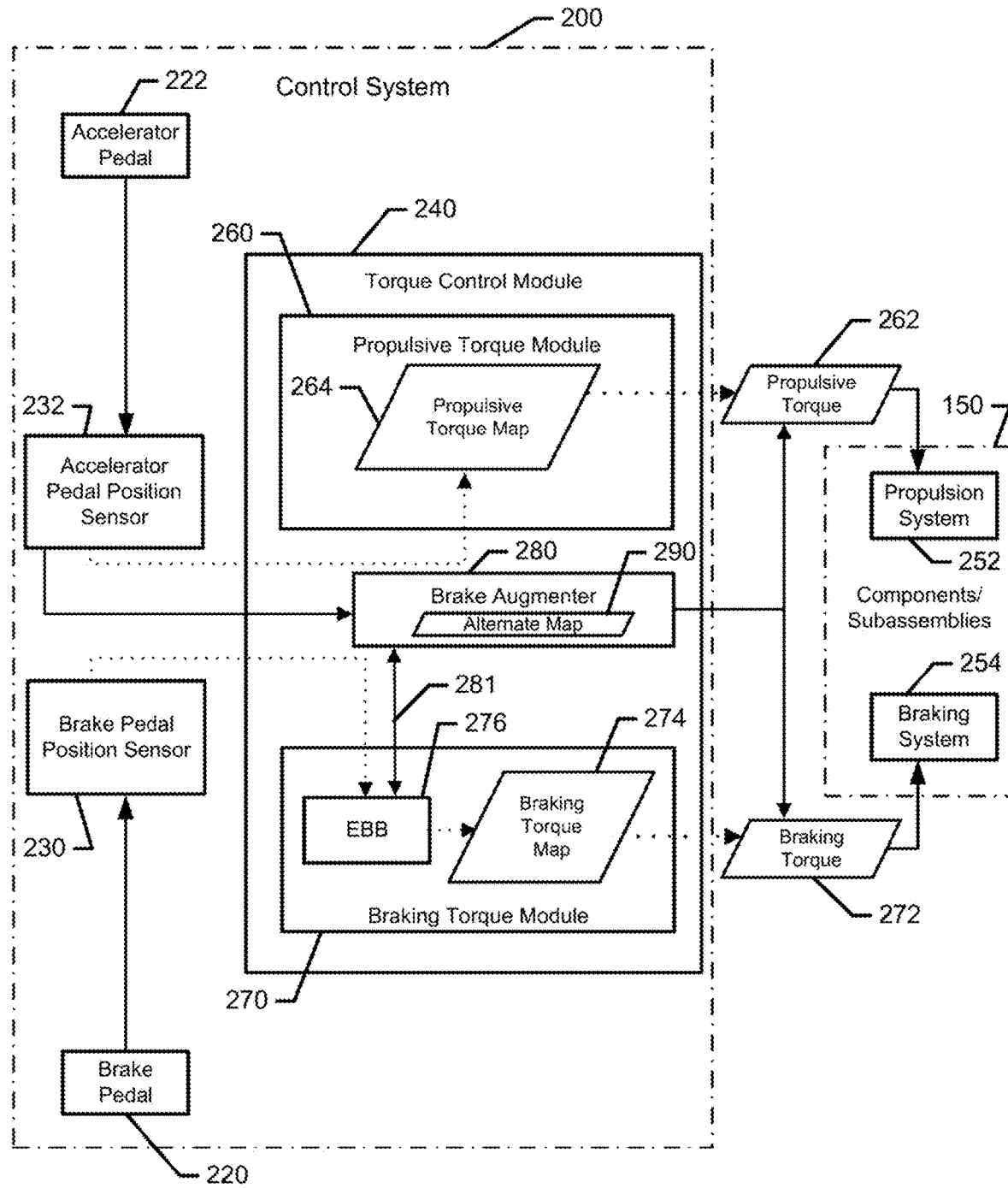
FIG. 3 illustrates a block diagram of some components of the vehicle control system of FIG. 1 in accordance with an example embodiment.

FIG. 3 illustrates a block diagram showing operation of the control system 200 from FIG. 2 under alternative operating circumstances. In FIG. 3, inactive connections or couplings are shown in dotted lines, and various connections or couplings that were dashed or dotted in FIG. 2, which become activated are shown instead in solid lines in FIG. 3.

In the alternative operating circumstances of FIG. 3, the brake pedal position sensor 230 may be unable to provide input data or at least accurate input data to the braking torque module 270, or to obtain an accurate value for braking torque 272 due to inoperability of the EBB system 276. In such cases, the operability indicator 281 may provide a positive or negative indication of the inoperability of the EBB system 276 to the brake augmenter 280, and the brake augmenter 280 may activate the solid line connections shown in FIG. 3, and deactivate the dotted line connections. In this regard, a positive indication may be provided by a signal indicating that the EBB system 276 is powered, is operating correctly, and/or is participating in generating the braking torque 272. The negative indication may be provided by the loss of a signal (such as a loss of the positive indication), or as a signal indicating that power is lost to the EBB system 276 or it is not generating the braking torque 272 (e.g., as would be the case if no braking torque 272 is received by the braking system 254). As such, the brake augmenter 280 may be a controller in its own right, or a module or portion of another controller (e.g., a vehicle control unit (VCU) of the vehicle 110), and the brake augmenter 280 may implement control functions or algorithms based on inputs received thereat including, for example, the operability indicator 281. The control functions or algorithms may include an examination of whether the operability indicator 281 indicates proper functioning of the EBB system 276, although other inputs may also be provided in some cases, and the control functions or algorithms may control connections or activations of system components to activate the brake augmenter 280 functionality as described herein.

After the operability indicator 281 has activated the brake augmenter 280, the brake pedal position sensor 230 may no longer be relied upon to generate the braking torque 272, and an alternative means of operating the braking system 254 may be employed. In particular, an alternate pedal map (e.g., alternate map 290) may be employed to drive outputs for the positive torque 262 and the braking torque 272 (either via the positive torque module 260 and braking torque module 270, or directly and without passing through the positive torque module 260 and braking torque module 270, as shown in FIG. 3). As such, in some embodiments, the presence of the operability indicator 281 may be considered as a mode selector. In such cases, the example of FIG. 2 may represent a normal mode or a first mode, and the example of FIG. 3 may represent a backup or a second mode. Although a transfer to the backup mode or second mode may normally happen automatically in response to the operability indicator 281, it may also be possible to transition to the backup mode or second mode via a mode selector (e.g., for testing or maintenance). If the backup mode or second mode is entered into automatically, such mode can generally not be exited without fixing the condition that caused entry into the backup or second mode.

In this regard, for example, the accelerator pedal position sensor 232 may provide input data to the brake augmenter 280 rather than, or in addition to, the propulsive torque module 260. In some embodiments, the brake augmenter 280, via the association with the alternate map 290, may reconfigure the application of the accelerator pedal 222 to provide both braking torque 272 to the braking system 254 and propulsive torque 262 to the propulsion system 252 via mapping of different respective ranges of pedal position to corresponding braking or propulsive ranges of operation. Thus, for example, when the braking torque module 270 is incapable of signaling (or properly signaling) for braking torque 272, the propulsive torque map 264 and the braking torque map 274 that are normally employed may be replaced by the alternate map 290. In this regard, the brake augmenter 280 may take over the functionality of the EBB system 276, which may also be in an inoperable state, to provide braking torque 272 via the pedal mapping that is alternatively provided via a single pedal (i.e., the accelerator pedal 222). Under such alternative operating circumstances where the EBB system 276 is unable to apply a boost to the force on the brake pedal 220, the brake augmenter 280 may determine the operator's 125 acceleration and braking demands and relay that information to the alternate map 290 for appropriate translation into braking torque 272 and propulsive torque 262. In some embodiments, under alternative operating circumstances, the braking torque 272 applied to the braking system 254 may come from a different source responsive to the braking torque module 270 being in an inoperable state. Thus, for example, if a first brake (e.g., friction brakes, regenerative brakes or another braking sources) is normally used within the braking system 254, then a second brake (e.g., a different set of friction brakes, regenerative brakes or other braking source) may be used by the brake augmenter 280. However, in other examples, the same brakes may be used on both cases. Meanwhile, either the same power source, or a different (e.g., backup) power source may be used to provide power for application of the brakes when the brake augmenter 280 operates.

The alternate map 290 may be broken up into two ranges of pedal positions separated by a zero or neutral point. The neutral point may define a pedal location within the full range of motion of the accelerator pedal 222 that is mapped (e.g., in the alternate map 290) to no positive (propulsive) or negative (braking) torque being applied, and therefore the vehicle 110 neither speeds up nor slows down. In some embodiments, a first range of pedal positions may be defined from the resting position of the accelerator pedal 222 (i.e. the position the accelerator pedal 222 assumes when the operator 125 does not apply a force to the accelerator pedal 222) to the neutral point. A second range of pedal positions may be defined from the neutral point down to a position of maximum travel of the accelerator pedal 222 (i.e. the accelerator pedal 222 is "floored"). In some embodiments, the alternate map 290 may be constructed in a manner such that a maximum amount of braking torque 272 is applied to the braking system 254 responsive to the operator 125 applying no force to the accelerator pedal 222 (i.e. the operator 125 is completely off of the accelerator pedal 222), and the braking torque 272 may decrease to the neutral point, at which time propulsive torque 262 begins to increase until the accelerator pedal 222 is floored or taken to its position of maximum depression.

Thus, for example, as the force from an operator 125 on the accelerator pedal 222 increases in the first range of pedal positions, the amount of braking torque 272 being applied to the braking system 254 may linearly decrease due to the brake augmenter 280 and the alternate map 290. In some cases, the neutral point may separate the first range of pedal positions from the second range of pedal positions at a distance equal to roughly half of the total distance of possible travel of the accelerator pedal 222. The neutral point may be the pedal position across which a transition between braking torque 272 and propulsive torque 262 occurs. In some embodiments, as the force from the operator 125 on the accelerator pedal 222 increases in the second range of pedal positions, the amount of propulsive torque 262 being applied to the propulsion system 252 may linearly increase due to the brake augmenter 280 and the alternate map 290. In this regard, the alternate map 290 may allow for the operator 125 to maintain control over the braking system 254 and the propulsion system 252 of the vehicle 110 in the event that the EBB system 276 is either inoperable, or not operating properly.

A vehicle control system for a vehicle may therefore be provided. The system vehicle control system may include a brake pedal position sensor, a braking torque module, an accelerator pedal position sensor, and a brake augmenter. The brake pedal position sensor is operably coupled to a brake pedal to determine a brake pedal position responsive to actuation of the brake pedal by an operator of the vehicle. The braking torque module is operably coupled to one or more wheels of the vehicle to provide negative torque to the one or more wheels based on the brake pedal position when an EBB system of the braking torque module is in an operable state. The accelerator pedal position sensor is operably coupled to an accelerator pedal to determine accelerator pedal position for generation of positive torque to provide to the one or more wheels based on the accelerator pedal position when the EBB system is in the operable state. The brake augmenter is operably coupled to the accelerator pedal position sensor to provide a negative torque input to the one or more wheels responsive to the accelerator pedal position sensor indicating a first range of pedal positions and a positive torque input to the one or more wheels responsive to the accelerator pedal position sensor indicating a second range of pedal positions when the EBB system is in an inoperable state.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the first range of pedal positions and the second range of pedal positions may be separated by a neutral point, and at the neutral point, both the positive torque input and the negative torque input are substantially equal to zero. In an example embodiment, the neutral point may be disposed between opposite extreme ends of the first range of pedal positions and the second range of pedal positions. In some cases, the first range of pedal positions and the second range of pedal positions may be defined in an alternate pedal map that maps the accelerator pedal position to a range of negative torque values in the first range of pedal positions and to a range of positive torque values in the second range of pedal positions, and wherein the alternate pedal map is implemented responsive to an indication of the EBB system being in the inoperable state. In an example embodiment, the range of positive torque values increase linearly or nonlinearly over the second range of pedal positions as the accelerator pedal is depressed past the neutral point. In some cases, the range of negative torque values decrease linearly over the first range of pedal positions as the accelerator pedal is depressed toward the neutral point. In an example embodiment, the brake pedal is inoperable responsive to the EBB system being in the inoperable state based on a positive indication that the EBB system is inoperable. In some cases, the brake pedal may be inoperable responsive to the EBB system being in the inoperable state based on a negative indication that the EBB system is operable. In an example embodiment, the braking torque module may be operably coupled to a braking system comprising electric parking brakes, electro-mechanical brakes, hydraulic brakes, or regenerative brakes. In some cases, a power source of the braking torque module or the brake augmenter changes to or is always supplied by a backup power source when the EBB system is in the inoperable state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system of a vehicle, the system comprising:
    a brake pedal position sensor operably coupled to a brake pedal to determine a brake pedal position responsive to actuation of the brake pedal by an operator of the vehicle;
    a braking torque module operably coupled to one or more wheels of the vehicle to provide negative torque to the one or more wheels based on the brake pedal position when an electronic brake boost (EBB) system of the braking torque module is in an operable state;
    an accelerator pedal position sensor operably coupled to an accelerator pedal to determine accelerator pedal position for generation of positive torque to provide to the one or more wheels based on the accelerator pedal position when the EBB system is in the operable state; and
    a brake augmenter operably coupled to the accelerator pedal position sensor to provide a negative torque input to the one or more wheels responsive to the accelerator pedal position sensor indicating a first range of pedal positions and a positive torque input to the one or more wheels responsive to the accelerator pedal position sensor indicating a second range of pedal positions when the EBB system is in an inoperable state.

2. The vehicle control system of claim 1, wherein the first range of pedal positions and the second range of pedal positions are separated by a neutral point, and wherein at the neutral point, both the positive torque input and the negative torque input are substantially equal to zero.

3. The vehicle control system of claim 2, wherein the neutral point is disposed between opposite extreme ends of the first range of pedal positions and the second range of pedal positions.

4. The vehicle control system of claim 1, wherein the first range of pedal positions and the second range of pedal positions are defined in an alternate pedal map that maps the accelerator pedal position to a range of negative torque values in the first range of pedal positions and to a range of positive torque values in the second range of pedal positions, and wherein the alternate pedal map is implemented responsive to an indication of the EBB system being in the inoperable state.

5. The vehicle control system of claim 4, wherein the range of positive torque values increase linearly over the second range of pedal positions as the accelerator pedal is depressed past the neutral point.

6. The vehicle control system of claim 4, wherein the range of negative torque decrease linearly over the first range of pedal positions as the accelerator pedal is depressed toward the neutral point.

7. The vehicle control system of claim 1, wherein the brake pedal is inoperable responsive to the EBB system being in the inoperable state based on a positive indication that the EBB system is inoperable.

8. The vehicle control system of claim 1, wherein the brake pedal is inoperable responsive to the EBB system being in the inoperable state based on a negative indication that the EBB system is operable.

9. The vehicle control system of claim 1, wherein the braking torque module is operably coupled to a braking system comprising electro-mechanical brakes, hydraulic brakes, electric parking brakes or regenerative brakes.

10. The vehicle control system of claim 1, wherein a power source of the braking torque module or the brake augmenter changes to or is always supplied by a backup power source when the EBB system is in the inoperable state.

11. A torque control module of a vehicle, the module comprising:
   a braking torque module operably coupled to one or more wheels of the vehicle to provide negative torque to the one or more wheels based on brake pedal position when an electronic brake boost (EBB) system of the braking torque module is in an operable state;
   a positive torque module operably coupled to the one or more wheels to provide positive torque to the one or more wheels based on accelerator pedal position when the EBB system is in the operable state; and
   a brake augmenter operably coupled to an accelerator pedal position sensor to provide a negative torque input to the one or more wheels responsive to the accelerator pedal position sensor indicating a first range of pedal positions and a positive torque input to the one or more wheels responsive to the accelerator pedal position sensor indicating a second range of pedal positions when the EBB system is in an inoperable state.

12. The module of claim 11, wherein the first range of pedal positions and the second range of pedal positions are separated by a neutral point, and wherein at the neutral point, both the positive torque input and the negative torque input are substantially equal to zero.

13. The module of claim 12, wherein the neutral point is disposed between opposite extreme ends of the first range of pedal positions and the second range of pedal positions.

14. The module of claim 11, wherein the first range of pedal positions and the second range of pedal positions are defined in an alternate pedal map that maps the accelerator pedal position to a range of negative torque values in the first range of pedal positions and to a range of positive torque values in the second range of pedal positions, and wherein the alternate pedal map is implemented responsive to an indication of the EBB system being in the inoperable state.

15. The module of claim 14, wherein the range of positive torque values increase linearly or nonlinearly over the second range of pedal positions as the accelerator pedal is depressed past the neutral point.

16. The module of claim 14, wherein the range of negative torque decrease linearly or nonlinearly over the first range of pedal positions as the accelerator pedal is depressed toward the neutral point.

17. The module of claim 11, wherein the brake pedal is inoperable responsive to the EBB system being in the inoperable state based on a positive indication that the EBB system is inoperable.

18. The module of claim 11, wherein the brake pedal is inoperable responsive to the EBB system being in the inoperable state based on a negative indication that the EBB system is operable.

19. The module of claim 11, wherein the braking torque module is operably coupled to a braking system comprising electro-mechanical brakes, hydraulic brakes, electric parking brakes or regenerative brakes.

20. The module of claim 11, wherein a power source of the braking torque module or the brake augmenter changes to or is always supplied by a backup power source when the EBB system is in the inoperable state.

* * * * *

UNITED STATES PATENT AND TRADEMARK OFFICE
CERTIFICATE OF CORRECTION

| | | |
|---|---|---|
| PATENT NO. | : 11,993,179 B2 | Page 1 of 1 |
| APPLICATION NO. | : 17/557789 | |
| DATED | : May 28, 2024 | |
| INVENTOR(S) | : Chad Korte et al. | |

It is certified that error appears in the above-identified patent and that said Letters Patent is hereby corrected as shown below:

On the Title Page

In the Title, "BOOSTER BRAKE" should read -- BOOSTED BRAKE --

In the Specification

In Column 1, the Title, Line 2, "BOOSTER BRAKE" should read -- BOOSTED BRAKE --

Signed and Sealed this
Nineteenth Day of August, 2025

Coke Morgan Stewart
*Acting Director of the United States Patent and Trademark Office*